United States Patent [19]

Bussink et al.

[11] Patent Number: 5,576,413
[45] Date of Patent: Nov. 19, 1996

[54] FLAME RETARDANT POLYCARBONATE COMPOSITIONS

[75] Inventors: Jan Bussink, Bergen op Zoom, Netherlands; Henricus G. C. Denissen, Weelde, Belgium; Erwin M. A. Gijzen, Poortvliet, Netherlands; Hendrik T. van de Grampel; Theodorus L. Hoeks, both of Bergen op Zoom, Netherlands; Henricus H. M. van Hout, Halsteren, Netherlands

[73] Assignee: General Electric Company, Pittsfield, Mass.

[21] Appl. No.: 233,285

[22] Filed: Apr. 25, 1994

[51] Int. Cl.$^6$ .................................................. C08G 64/00
[52] U.S. Cl. ............................................. 528/196; 528/198
[58] Field of Search .................................... 528/196, 198

[56] References Cited

U.S. PATENT DOCUMENTS

| | | | |
|---|---|---|---|
| 3,160,606 | 12/1964 | Dietrich | 528/196 |
| 3,879,347 | 4/1975 | Serini et al. | 528/196 |
| 4,217,438 | 8/1980 | Brunelle et al. | 528/202 |
| 4,310,656 | 1/1982 | Brunelle | 528/200 |
| 4,330,664 | 5/1982 | Brunelle | 528/198 |
| 4,737,573 | 4/1988 | Silva et al. | 528/371 |
| 5,194,564 | 3/1993 | Davis et al. | 528/167 |

FOREIGN PATENT DOCUMENTS

| | | |
|---|---|---|
| 1225488 | 8/1987 | Canada . |
| 0143386 | 6/1985 | European Pat. Off. . |
| 1308630 | 9/1961 | France . |
| 1322855 | 1/1962 | France . |
| 0047328 | 1/1992 | Japan . |

*Primary Examiner*—James J. Seidleck
*Assistant Examiner*—Terressa Mosley

[57] ABSTRACT

Polycarbonate compositions comprising copolymers of bis-(4-hydroxyphenyl)methane and 2,2-bis-(4-hydroxyphenyl)propane are described and they unexpectedly display high glass transition temperatures, high impact resistances, flame retardant properties and superior brittle ductile transition temperature.

21 Claims, No Drawings

FLAME RETARDANT POLYCARBONATE COMPOSITIONS

FIELD OF THE INVENTION

This invention relates to novel polycarbonate compositions. Said polycarbonate compositions contain copolymers of aromatic polycarbonates and they unexpectedly display high glass transition temperatures, high impact resistances, flame retardant properties as well as superior brittle ductile transition temperatures.

BACKGROUND OF THE INVENTION

Polycarbonates are a well known class of high impact resistant thermoplastic resins characterized by optical clarity, high ductility as well as other advantageous properties. They are frequently employed as lenses and windows as a result of their transparency. Bisphenol A polycarbonate (BPA) is the predominant commercially available resin of this type. It is derived from 2,2-bis(4-hydroxyphenyl)propane, and ordinarily has a glass transition temperature of about 150° C.

It is of increasing interest to prepare polycarbonates which, while retaining the heat resistance of bisphenol A polycarbonates, have higher ductility and are therefore more resistant to damage when handled. Moreover, there is need for polycarbonates which possess flame retardant properties since they are, for instance, conventionally used in the automotive and computer industries. Several flame retardant agents have been utilized in an attempt to produce flame retardant polycarbonates. For example, alkali metal salts of strong sulfonic acids are commonly used. However, when incorporated into the polycarbonate, the resulting polymer is hydrolyrically sensitive. Further, when using these salts, it is also necessary to employ drip inhibitors or gas phase flame retardant agents. This is not ideal since drip inhibitors destroy the clarity of the polymer and gas phase retardants are often halogenated which creates problems with corrosion and toxicity. As an alternative to the above, phosphorus containing compounds such as triphenylphosphate have been used. When blended with a base polycarbonate, some flame retardant properties are observed. However, the resulting polymer blends are not desirable since they possess low glass transition temperatures (Tg) and low impact resistance when compared to the base resin.

Accordingly, the instant invention is directed to novel polycarbonate compositions. Said polycarbonate compositions contain copolymers of aromatic polycarbonates and they unexpectedly display high glass transition temperatures, high impact resistances, flame retardant properties as well as superior brittle ductile transition temperatures.

DESCRIPTION OF THE PRIOR ART

Attempts have been made to prepare polycarbonates that possess flame retardant properties. In commonly assigned U.S. Pat. No. 5,194,564, polycarbonates comprising monophosphine copolymers are described, and said copolymers are employed to enhance the flame retardant properties of the polycarbonates.

Other investigators have focused on the preparation of flame retardant copolycarbonates. In European patent 0,143,386, copolycarbonates of bis-(3,5-dimethyl-4-hydroxyphenyl)methane and 2,2-bis-(3,5-dimethyl- 4-hydroxyphenyl)propane are disclosed, wherein said copolycarbonates possess flame retardant characteristics.

The instant invention, however, is patentably distinguishable from the above-described since, among other reasons, it is directed to polycarbonate compositions comprising copolymers of aromatic polycarbonates, wherein the polycarbonate compositions unexpectedly display high glass transition temperatures, high impact resistances, flame retardant properties and superior brittle ductile transition temperatures.

SUMMARY OF THE INVENTION

The polycarbonate compositions of the instant invention which unexpectedly display high glass transition temperatures, high impact resistances, flame retardant properties and superior brittle ductile transition temperatures comprise copolymers of aromatic polycarbonates (copolycarbonates), and said copolycarbonates have structural units of the formulae

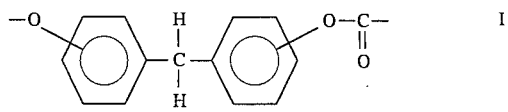

and

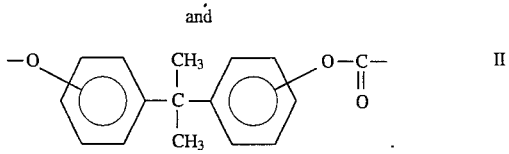

While it is within the scope of the invention to include all isomers, the polycarbonate compositions of the instant invention often comprise at least about 50% para,para isomers but preferably at least about 85% para,para isomers. Moreover, in the instant invention, high glass transition temperatures are defined as at least about 125° C. but preferably about 135° C., high impact resistances are defined as greater than about 700 J/m at room temperature, flame retardant properties mean that UL-94 is V-0 or V-1 at 1.6 mm and V-0 at 2.5 and 3.2 mm and superior brittle ductile transition temperatures are defined as less than about −20° C. but preferably less than about −25° C.

DETAILED DESCRIPTION OF THE PREFERRED EMBODIMENTS

Formulae I and II represent structural units derived from bis-(4-hydroxyphenyl)methane (BPF) and bis-(4-hydroxyphenyl)propane (BPA) respectively. The former can be prepared, for instance, via the condensation of formaldehyde with excess phenol. Said condensation is conducted either continuously or discontinuously in the presence of $H_2SO_4$ or, according to the Hooker process, with dry HCl as a catalyst and methylmercaptan as a promoter. The reaction is carried out at approximately 50° C., the yield being almost quantitative. The latter is often prepared in a similar fashion except that acetone is employed in lieu of formaldehyde.

The copolycarbonates of the instant invention may be formed by subjecting BPA and BPF to any method conventional in the art. Examples of such methods include an interfacial process, a transesterification process and a bishaloformate process.

The preferred method is interfacially, that is, in a mixed aqueous-organic system which results in recovery of the copolycarbonate in the organic phase. A carbonate precursor is used in the interfacial reaction and is preferably phosgene. When using an interfacial process it is also standard practice to use a catalyst system well known in the synthesis of polycarbonates and copolyestercarbonates. Suitable catalysts include tertiary amines. Tertiary amines include aliphatic amines such as triethylamine, tri-n-propylamine, diethyl-n-propylamine, and tri-n-butylamine, and highly nucleophilic heterocyclic amines such as 4-dimethylaminopyridine. Such amines generally contain at least about 6 and preferably about 6–14 carbon atoms. The most useful amines are trialkylamines containing no branching on the carbon atoms in the 1- and 2-positions. Triethylamine is the most preferred.

A chain terminating agent to control the molecular weight of the polymers is usually present. Suitable chain termination agents are those commonly employed for polycarbonate formation, including monohydroxyaromatic compounds such as phenol, p-t-butylphenyl and p-cumylphenol. Phenol is preferred. Quantities of chain terminating agents can range from about 0.5 to about 7 mole percent based on the total amount of non-phosphorus dihydroxyaromatic compound employed.

Another method of preparing the copolycarbonates is by transesterification with a bisphenol of a carbonate ester such as diphenyl carbonate or a bis-polyfluoroalkyl carbonate. U.S. Pat. Nos. 4,217,438, 4,310,656 and 4,330,664 describe the formation of polycarbonates by a transesterification method and are hereby incorporated by reference.

Still another method of copolycarbonate formation is the reaction of bishaloformates with alkali metal hydroxides and various amines. One method for reaction bishaloformates with dihydroxy compounds is disclosed in U.S. Pat. No. 4,737,573 which is hereby incorporated by reference. Generally bischloroformate oligomer compositions are prepared by passing phosgene into a heterogeneous aqueous-organic mixture containing at least one dihydroxyaromatic compound. The reaction is a condensation reaction that typically takes place interfacially.

The copolycarbonates of this invention often contain no more than about 95 percent by weight of BPA but preferably no more than about 50 percent by weight of BPA and most preferably no more than about 75 percent by weight BPA based on total weight of the BPA/BPF copolycarbonate in the polycarbonate composition and the polycarbonate compositions comprise of at least about 90 percent by weight of said copolycarbonates based on total weight of the composition. Further, copolycarbonates as used throughout include straight chain, branched and graft polymers as well as random, regular and block polymers.

It is also within the scope of this invention to include in said polycarbonate compositions conventional additives which include, for example, thickening agents, glass fibers, flame retardant additives, pigments, dyes, stabilizers, impact modifiers and the like. Drip inhibitors such as polytetrafluoroethylene may also be employed, however, they are not required. Additionally, the polycarbonate compositions of the instant invention may contain less than about 10 percent by weight of BPA polycarbonate resins/homopolymers based on total weight of the polycarbonate composition.

The following example illustrates and facilitates the production of the flame retardant polycarbonate compositions of the instant invention. The molecular structure of the product may be confirmed by proton and carbon 13 nuclear magnetic resonance spectroscopy.

EXAMPLE

A 500 ml 5-necked flask equipped with a phosgene outlet, reflux condenser, nitrogen inlet, pH probe connected to a caustic addition controller, caustic inlet and mechanical stirrer was charged with 11.25g (0.0493 mole) BPA, 3.75g (0.0188 mole) BPF, 120 ml of methylene chloride, 100 ml deionized water, 2.0 ml of a solution of 1.664g triethylamine in 25.0 ml methylene chloride (0.133g, 0.00132 mole, 2.0 mole percent BPA) and 2.0 ml of a solution of 2.319g phenol in 25 ml methylene chloride (0.186g, 0.00197 mole, 3.0 mole percent BPA). Phosgene was passed through the mixture at a rate of 0.4g/min while maintaining a pH between 8.0 and 8.5. After 15 minutes, the pH was maintained between 10.0 and 10.5 for an additional 4.5 minutes at which time the flow of phosgene was stopped. Excess phosgene was purged with a stream of nitrogen. The mixture was poured into a separatory funnel containing 1.0N HCl and resulting layers were separated. The organic layer was washed twice with 1.0N HCl and ten times with water, precipitated in methanol, reslurried three times in methanol and dried in a 105° C. vacuum oven for 18 hours. The resulting product was copolymer powder in quantitative yield. The copolymer powder produced was then mixed with 0.35g of tris(di-t-butylphenyl) phosphite stabilizer and fed into an extruder at 300° C. resulting in a flame retardant polycarbonate composition comprising a copolycarbonate of 75%/25% by weight BPA/BPF.

The data in the following table has been compiled to demonstrate the new and unexpected superior properties of the compositions of the instant invention. All entries have been prepared in the manner similar to the one described in the Example.

TABLE

| Entry | Polycarbonate[A] | Ratio[C] | Additives[D] | Impact Resistances (J/m)[E] | Flame Retardancy | Brittle Ductile Transition Temperature (°C.) |
|---|---|---|---|---|---|---|
| 1 | BPA | 100% | None | 837.5 | V-2[F] | −20.0 |
| 2 | BPA | 100% | Yes | 872.0 | V-2[F] | −15.0 |
| 3 | BPA/BPF | 75%/25% | None | 710.0 | V-1[G] | −35.0 |
| 4 | BPA/BPF | 75%/25% | Yes | 855.5 | V-0[H] | −35.0 |
| 5 | TMBPA/TMBPF[B] | 75%/25% | None | <300 | V-0[H] | >20° C. |

[A]Polycarbonate present in the polycarbonate composition.
[B]2,2-bis-(2,6-dimethyl-4-hydroxyphenyl)propane/2,2-bis-(2,6-dimethyl-4-hydroxyphenyl)methane.
[C]Percent weight of BPA and percent weight ratio of BPA/BPF and TMBPA/TMBPF based on total weight of polycarbonate in the composition.
[D]0.14% and 0.25% by weight of the total composition comprising tris(di-t-butylphenyl) phosphite as a stabilizer and potassium diphenylsulfanate, respectively.
[E]Notched Izod. ASTM D256 at 3.2 mm.
[F]UL-94 is V-2 at 1.6 mm.
[G]UL-94 is V-1 at 1.6 mm.
[H]UL-94 is V-0 at 1.6 mm, 2.5 mm and 3.2 mm.

What is claimed is:

1. A copolycarbonate consisting essentially of structural units of the formulae

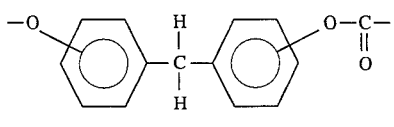 I and

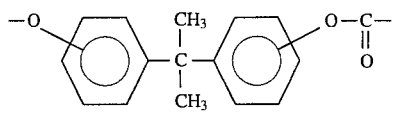 II wherein said copolycarbonate contains no more than about 95 percent by weight of formula II based on total weight of copolycarbonate in the polycarbonate composition.

2. A polycarbonate composition in accordance with claim 1 wherein said copolycarbonate contains no more than about 75 percent by weight of formula II based on total weight of copolycarbonate in the polycarbonate composition.

3. A polycarbonate composition in accordance with claim 2 wherein said copolycarbonate contains no than about 50 percent by weight of formula II based on total weight of the copolycarbonate in the polycarbonate composition.

4. A copolycarbonate consisting essentially of structural units of the formulae

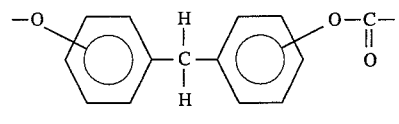 I and

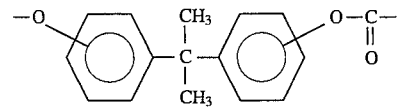 II wherein said copolycarbonate is a random copolymer.

5. A co polycarbonate consisting essentially of structural units of the formulae

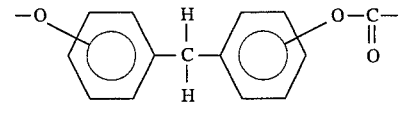 I and

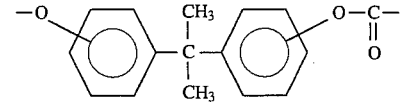 II wherein said copolycarbonate is a block copolymer.

6. A polycarbonate composition consisting essentially of structural units of the formulae

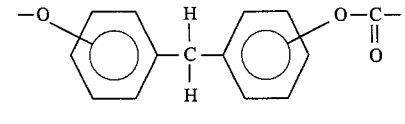 I and

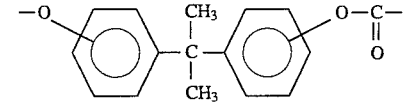 II and a BPA homopolymer wherein said polycarbonate composition contains less than about 10 percent by weight of a BPA homopolymer based on total weight of the polycarbonate composition.

7. A polycarbonate composition consisting essentially of structural units of the formulae

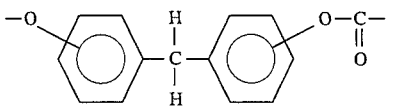 I and

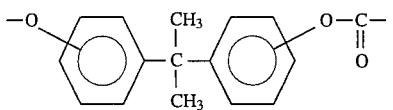 II and a BPF homopolymer wherein said polycarbonate composition contains less than about 10 percent by weight of a BPF homopolymer based on total weight of the polycarbonate composition.

8. A polycarbonate composition in accordance with claim 1 wherein said polycarbonate composition additionally comprises additives.

9. A polycarbonate composition in accordance with claim 8 wherein said additives are thickening agents, glass fibers, flame retardant additives, pigments, dyes, stabilizers or impact modifiers.

10. A copolycarbonate composition consisting essentially of structural units of the formulae

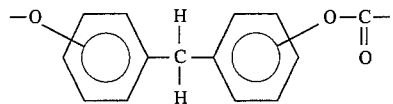 I and

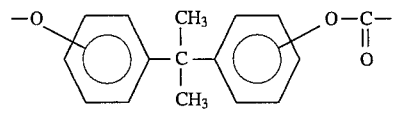 II wherein at least about 50% of the structural units are para, para isomers.

11. A polycarbonate composition in accordance with claim 10 wherein at least about 85% of the structural units are para,para isomers.

12. A polycarbonate composition in accordance with claim 5 wherein said polycarbonate composition additionally comprises additives.

13. A polycarbonate composition in accordance with claim 12 wherein said additives are thickening agents, glass fibers, flame retardant additives, pigments, dyes, stabilizers or impact modifiers.

14. A polycarbonate composition in accordance with claim 5 wherein said polycarbonate composition additionally comprises additives.

15. A polycarbonate composition in accordance with claim 14 wherein said additives are thickening agents, glass fibers, flame retardant additives, pigments, dyes, stabilizers or impact modifiers.

16. A polycarbonate composition in accordance with claim 6 wherein said polycarbonate composition additionally comprises additives.

17. A polycarbonate composition in accordance with claim 16 wherein said additives are thickening agents, glass fibers, flame retardant additives, pigment, dyes, stabilizers or impact modifiers.

18. A polycarbonate composition in accordance with claim 7 wherein said polycarbonate composition additionally comprises additives.

19. A polycarbonate composition in accordance with claim 18 wherein said additives are thickening agents, glass fibers, flame retardant additives, pigments, dyes, stabilizers or impact modifiers.

20. A polycarbonate composition in accordance with claim 10 wherein said polycarbonate composition additionally comprises additives.

21. A polycarbonate composition in accordance with claim 20 wherein said additives are thickening agents, glass fibers, flame retardant additives, pigments, dyes, stabilizers or impact modifiers.

* * * * *